(12) United States Patent
Matsuda et al.

(10) Patent No.: US 7,475,410 B2
(45) Date of Patent: Jan. 6, 2009

(54) DISC RECORDING AND/OR PLAYBACK APPARATUS

(75) Inventors: Mikinori Matsuda, Kanagawa (JP);
Kazuhito Kurita, Kanagawa (JP);
Takahiro Yamada, Saitama (JP);
Takashi Fukushima, Tokyo (JP)

(73) Assignee: Sony Corporation, Tokyo (JP)

( * ) Notice: Subject to any disclaimer, the term of this patent is extended or adjusted under 35 U.S.C. 154(b) by 448 days.

(21) Appl. No.: 11/301,204

(22) Filed: Dec. 12, 2005

(65) Prior Publication Data

US 2006/0184955 A1     Aug. 17, 2006

(30) Foreign Application Priority Data

Dec. 10, 2004   (JP) .............................. 2004-359013

(51) Int. Cl.
*G11B 17/04* (2006.01)
(52) U.S. Cl. ...................................... 720/643; 720/633
(58) Field of Classification Search ................. 720/631, 720/632, 633, 641, 643, 644
See application file for complete search history.

(56) References Cited

U.S. PATENT DOCUMENTS 6,057,995 A * 5/2000 Yamashita et al. .......... 360/133

2005/0251817 A1 * 11/2005 Yamada et al. .............. 720/640
2006/0179449 A1 *  8/2006 Kurita et al. ................ 720/738
2006/0291099 A1 * 12/2006 Ohgi .......................... 360/133

FOREIGN PATENT DOCUMENTS

| JP | 09091824   | * | 4/1997 |
| JP | 09106605   | * | 4/1997 |
| JP | 2003263819 | * | 9/2003 |

* cited by examiner

*Primary Examiner*—William J Klimowicz
(74) *Attorney, Agent, or Firm*—Wolf, Greenfield & Sacks, P.C.

(57) ABSTRACT

A disc cartridge can be loaded stably in the disc recorder/player, whether it is provided with a shutter member or not. The present invention provides a disc recording and/or playback apparatus including a cartridge holder in which there is to be held a first disc cartridge including a body and a shutter member, or a second disc cartridge including a body, a shutter member supporting mechanism to support, by pressing, the shutter member of the first disc cartridge to limit the movement of the shutter member, a pressing mechanism to press the second disc cartridge, and a pressing controlling mechanism which is moved due to displacement of the shutter member supporting mechanism by the first disc cartridge to displace the pressing mechanism for removing the pressure applied to the first disc cartridge and has the pressing mechanism press the second disc cartridge inserted in the cartridge holder.

9 Claims, 9 Drawing Sheets

DISC RECORDING AND/OR PLAYBACK APPARATUS

CROSS REFERENCES TO RELATED APPLICATIONS

The present invention contains subject matter related to Japanese Patent Application JP 2004-359013 filed in the Japanese Patent Office on Dec. 10, 2004, the entire content of which is incorporated herein by reference.

BACKGROUND OF THE INVENTION

1. Field of the Invention

The present invention generally relates to a disc recording and/or playback apparatus compatible with a disc cartridge housing a disc-shaped recording medium such as optical disc or the like, and more particularly, to a disc recording and/or playback apparatus compatible with a disccartridge of a type housing a disc-shaped recording medium in the body thereof, having formed inthe body a write and/or read aperture through which the disc-shaped recording medium is partially exposed to outside in a range between inner and outer radii thereof, and provided with a shuttermember that is to open and close the write and/or read aperture, and a disc cartridge of a type housing a disc-shaped recording medium in a body thereof, having a write and/or read apertureformed in the cartridge body through which part of the disc-shaped recording medium is exposedto outside in a range between inner and outer radii thereof, and not provided with any shutter member that is to open and close the write and/or read aperture that will thus be left open.

2. Description of the Related Art

In the past, there is widely used the disc cartridge having a disc-shaped recording medium such as optical disc housed rotatably in a body thereof and which is to be loaded in a disc recording and/or playback apparatus with the disc-shaped recording medium being housed in the cartridge body. The disc cartridge of this type can protect the disc-shaped recording medium housed therein and facilitate loading and unloading of the disc-shaped recording medium into and from the disc recording and/or playback apparatus.

The above disc cartridge has formed therein a write and/or read aperture through which the signal recording area of, for example, an optical disc housed in the cartridge body is partially exposed to outside in a range between inner and outer radii thereof. An optical pickup or a magnetic head of a write/read means provided at the disc recording and/or playback apparatus approaches the write and/or read aperture and scans the signal recording area of the optical disc, thereby recording or reproducing information signals to or from the optical disc.

However, if the write and/or read aperture formed in the cartridge body is left open, dust will possibly come into the cartridge body and contaminate the optical disc during storage of the disc cartridge or foreign matter coming into the cartridge body will possibly damage the optical disc during loading or unloading the optical disc into or from the disc recording and/or playback apparatus.

To overcome the above problems, the disc cartridge is provided with a shutter member to open and close the write and/or read aperture. Since the shutter member closes the write and/or read aperture while the disc cartridge is loaded in the disc recording and/or playback apparatus, the optical disc housed in the cartridge body can positively be protected.

Note here that it has been required that the disc-shaped recording media, especially, optical discs from and/or to which information signals are written or read, should be higher in recording density and larger in recording capacity. As a result, there have been proposed optical discs designed higher in recording capacity and so small that it can be held as a whole in the palm of one hand. The Applicant of the present invention proposed a disc cartridge housing an optical disc of this type in the Japanese Patent Application JP 2004-140491.

SUMMARY OF THE INVENTION

Even if an optical disc housed in a disc cartridge is designed small, a shutter member should desirably be provided on the disc cartridge to close a write and/or read aperture formed in the cartridge body in order to protect the optical disc.

However, the shutter member thus provided will make it complicated to produce the disc cartridge and also add to the number of parts, which will make it difficult to assemble the disc cartridge and add to the manufacturing cost.

Also, the disc cartridges each having housed therein an optical disc include ones that have not to protect the optical disc by closing the write and/or read aperture with the shutter member. For example, some of the read-only optical discs may not be protected at so a high level as the recording type optical discs.

When a disc cartridge of a type having no shutter member and thus keeping the write and/or read aperture open is stored or when it is not loaded in the disc recording and/or playback apparatus, the optical disc may be taken out of the cartridge body and housed in a storage case for protection.

Thus it is inferred that disc cartridges each having housed therein a disc-shaped recording medium such as optical disc and compatible with one and the same disc recording and/or playback apparatus include two types: one is provided with a shutter member and the other is not.

The disc recording and/or playback apparatus compatible with disc cartridges each provided with the shutter member includes a shutter member supporting mechanism that limits the movement of the shutter member and holds the latter in a position to open the write and/or read aperture or has a shutter member locking mechanism, which locks the shutter member provided on the disc cartridge in a position to close the write and/or read aperture, unlock the shutter member. The shutter member supporting mechanism of this type supports the shutter member by pressing with an elastic force or the like to limit the movement of the shutter member for keeping the latter in the position to open the write and/or read aperture.

Since the disc cartridge with the shutter member being loaded into the disc recording and/or playback apparatus is pressed and supported by the shutter member supporting mechanism, it can stably be held on a cartridge holder and loaded into the disc recording and/or playback apparatus.

On the other hand, the disc cartridge with no such a shutter member and having the write and/or read aperture left open will be inserted into the cartridge holder without being sufficiently supported because it has not any shutter member supporting mechanism to support the disc cartridge by pressing. The disc cartridge cannot be held positively and stably in the cartridge holder.

It is therefore desirable to overcome the above-mentioned drawbacks of the related art by providing a disc recording and/or playback apparatus in which a disc cartridge, whether the latter is provided with a shutter member or not, can stably be loaded.

It is also desirable to provide a recording and/or playback apparatus capable of supporting a loaded disc cartridge, whether the latter is provided with a shutter member or not, with the generally same force when writing or reading information signals to or from a disc-shaped recording medium housed in the disc cartridge.

According to the present invention, there is provided a disc recording and/or playback apparatus including: a cartridge holder in which there is to be held a first disc cartridge including a body having a disc-shaped recording medium housed rotatably therein, having formed thereinextending toward the center thereof from one of lateral sides thereof a write and/or read aperture through which the disc-shaped recording medium is partially exposed to outside in a range between inner and outerradii thereof and a shutter member supported movably on the cartridge body to open and close the write and/or read aperture, or a second disc cartridge including a body having a disc-shaped recording medium housed rotatably therein, having formed therein extending toward the center thereof from one of lateral sides thereof a write and/or read aperture through which the disc-shaped recordingmedium is partially exposed to outside in a range between inner and outer radii thereof; a shutter member supporting mechanism to support, by pressing, the shutter member of the first disccartridge inserted in the cartridge holder to limit the movement of the shutter member; a pressing mechanism to press the second disc cartridge inserted in the cartridge holder; and a pressingcontrolling mechanism provided in connection with the shutter member supporting mechanism andwhich is to be moved due to the displacement of the shutter member supporting mechanism by the first disc cartridge inserted into the cartridge holder to displace the pressing mechanism forremoving the pressure applied to the first disc cartridge and has the pressing mechanism press thesecond disc cartridge inserted in the cartridge holder.

The shutter member supporting mechanism used in the disc recording and/or playback apparatus is a shutter member supporting piece made of an elastic material and which is to resiliently be displaced by the shutter member provided on the first disc cartridge being inserted into the cartridge holder. The shutter member supporting piece is pressed by the disc cartridge being inserted into the cartridge holder and resiliently displaced in a direction away from the disc cartridge.

Also, the pressing controlling mechanism has the distance of movement thereof controlled correspondingly to the distance of displacement of the shutter member supporting mechanism, which varies depending upon of which type the disc cartridge inserted into the cartridge holder is, first or second, to control the pressure applied to the disc cartridge, first or second, inserted into the cartridge holder.

Some disc cartridges of the above-mentioned first type compatible with the disc recording and/or playback apparatus according to the present invention include a shutter locking mechanism that is to be engaged in an engagement hole formed in the shutter member when the shutter member is in a position to close the write and/or read aperture to lock the shutter member in that position. The shutter member supporting mechanism is also to be engaged in an engagement hole formed in the shutter member when the first disc cartridge is inserted into the cartridge holder. In case the first disc cartridge is inserted into the cartridge holder, the shutter locking mechanism is engaged from the engagement hole in the shutter member for enabling the shutter member to move in relation to the cartridge body.

In addition, the disc recording and/or playback apparatus according to the present invention includes an incorrect-insertion limiting mechanism in which once the first or second disc cartridge is incorrectly inserted into the cartridge holder with the lower side thereof being kept upside, the shutter member supporting mechanism is to be displaced by the shutter member provided on the first disc cartridge and engaged onto the shutter member to limit further insertion of the incorrectly inserted first or second disc cartridge into the cartridge holder correspondingly to a position the shutter member supporting mechanism takes for returning to its initial position.

In the disc recording and/or playback apparatus according to the present invention, if either the first disc cartridge with the shutter member or the second disc cartridge without any shutter member is inserted into the cartridge holder, it can be supported by the shutter member supporting mechanism or pressing mechanism. Thus, the disc cartridge can stably be placed and held in the cartridge holder.

Also, since either the first or second disc cartridge set in the cartridge holder is supported being pressed by either the shutter member supporting mechanism or the pressing mechanism, it will be placed under the generally same pressure whichever the type thereof is, first or second, and can be inserted into the cartridge holder and held there constant conditions.

Further, owing to the incorrect-insertion limiting piece, it is possible to prevent the disc cartridge from being inserted incorrectly, and protect the disc cartridge once inserted incorrectly as well as the shutter member supporting mechanism and pressing mechanism of the disc recording and/or playback apparatus.

DETAILED DESCRIPTION OF THE PREFERRED EMBODIMENTS

The disc recording and/or playback apparatus according to the present invention (will be referred to as "disc recorder/player" hereunder) is compatible with a first disc cartridge including a body having a disc-shaped recording medium such as optical disc housed rotatably therein and having a write and/or read aperture formed therein and a shutter member to open and close the write and/or read aperture, and a second disc cartridge without any shutter member to open and close the write and/or read aperture.

Prior to starting the explanation of the disc recorder/player according to the present invention, there will be explained the first and second disc cartridges compatible with the disc recorder/player.

Figure 1:
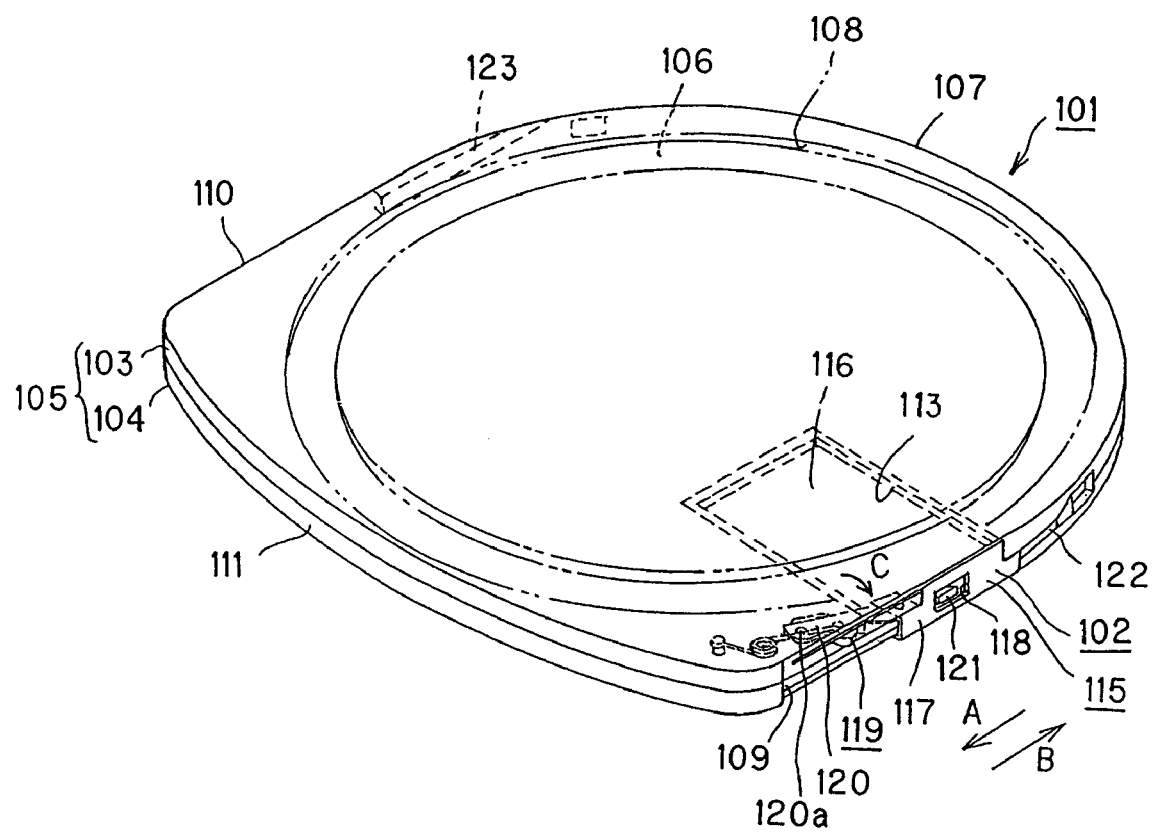
FIG. 1 is a perspective view, from the upper half, of the first disc cartridge compatible with the disc recording and/or playback apparatus according to the present invention.
Figure 2:
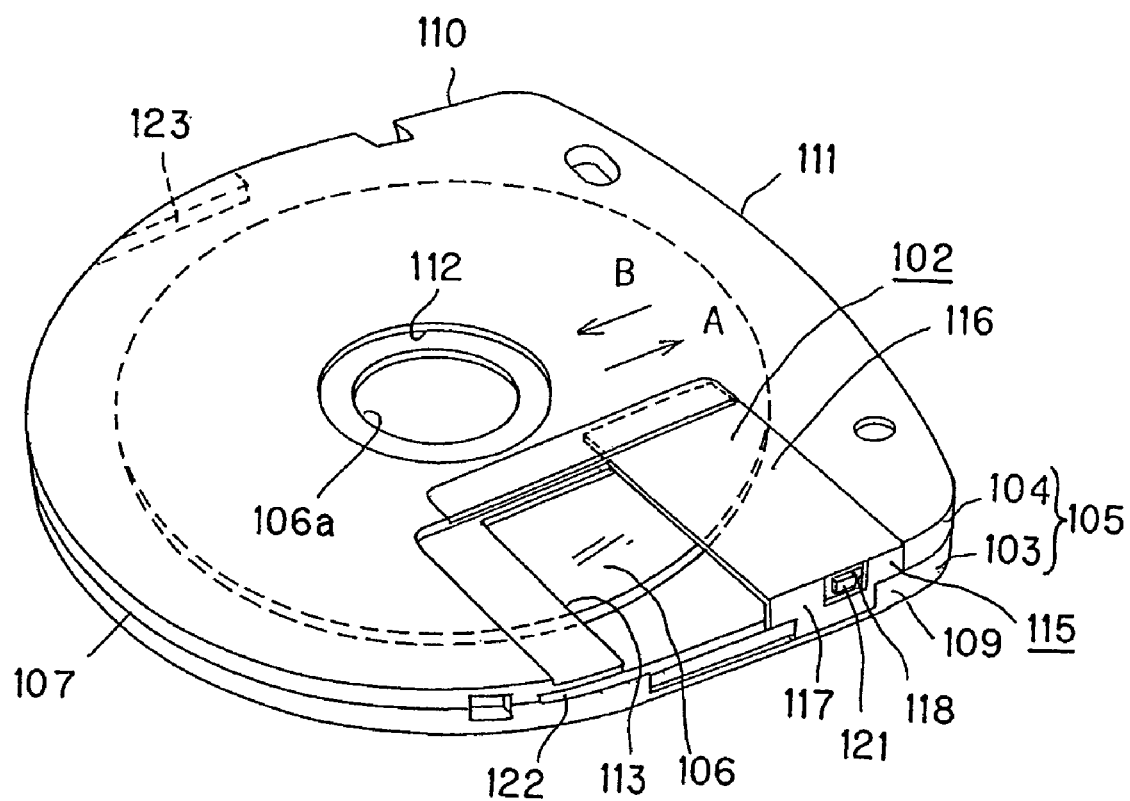
FIG. 2 is a perspective view, from the lower half, of the first disc cartridge in FIG. 1.

Referring now to FIGS. 1 and 2, there is schematically illustrated a disc cartridge of the first type in the form of perspective views. The first disc cartridge, generally indicated with a reference numeral 101, is provided with a shutter member 102. As will be seen from FIGS. 1 and 2, the first disc cartridge 101 includes a body 105 formed by butt-joining a pair of body halves 103 and 104, upper and lower, to each other. This cartridge body 105 has an optical disc 106 as a disc-shaped recording medium housed rotatably therein.

The disc cartridge 101 houses an optical disc 106 having recorded therein program data and video data for performing a video game, for example, and it is designed very small. This disc cartridge 101 houses, for example of an optical disc 106 of about 60 mm in diameter, and it is designed to have so small a size that it can be held as a whole in the palm of one hand.

Note that the first disc cartridge 101 referred to herein by way of example houses a read-only optical disc 106 having pre-recorded therein information signals such as program data.

As shown in FIGS. 1 and 2, the cartridge body 105 of the first disc cartridge 101 has a circular-formed front side 107 at which the disc cartridge 101 is first inserted into the disc recorder/player. The circular front side 107 is generally a half of a circle taking, as its center, the center of the optical disc 106 received in a disc receptacle 108 formed in the cartridge body 105 and which has a radius a little larger than that of the optical disc 106. That is, the circular front side 107 corresponds in shape to a half of the optical disc 106 received in the cartridge body 105.

In the cartridge body 105, the circular front side 107 is contiguous at opposite ends thereof to lateral sides 109 and 110, respectively, opposite and parallel to each other, and these lateral sides 109 and 110 are contiguous to a rear side 111 opposite to the circular front side 107 and which is gently curved. That is, the rear side 111 of the cartridge body 105 is smaller in curvature and larger in radius than the semicircular front side 107.

The first disc cartridge 101 has the nearly semicircular front side 107 at which it is first inserted into the disc recorder/player, and the rear side 111 opposite to the circular front side 107. Thus, the first disc cartridge 101 can be formed nearly as small as the optical disc 106 which is to be housed in the disc cartridge 101.

As shown in FIG. 2, the lower half 104 as the bottom of the cartridge body 105 has formed at the center thereof a circular central opening 112 through which a central hole 106a formed at the center of the optical disc 106 housed in the cartridge body 105 and its rim are exposed to outside. Part of a disc rotation driving mechanism provided at the disc recorder/player in which the disc cartridge 101 is to be loaded, for example, a turn-table, is to enter the central opening 112. As shown in FIG. 2, the lower half 104 as the bottom of the cartridge body 105 has also formed therein a write and/or read aperture 113 (will also be referred to as "disc-access aperture" hereunder) through which the optical head is to access the optical disc for write and/or read of information signals to and/or from the latter. The disc-access aperture 113 is located at one (109) of the lateral sides (109 and 110) of the cartridge body 105. It is formed rectangular to have a sufficient size to expose part, between inner and outer radii, of the signal recording area of the optical disc 106 housed in the cartridge body 105 to outside. That is, the disc-access aperture 113 is formed along the one lateral side 109, other than the circular front side 107, of the cartridge body 105 and which is straight and flat. Also, the disc-access aperture 113 is opened by cutting the lower half 104 at the one lateral side 109 as shown in FIG. 2.

As shown in FIGS. 1 and 2, the first disc cartridge 101 has provided thereon a shutter member 115 that opens and closes the disc-access aperture 113. The shutter member 115 includes a flat shutter portion 116 formed rectangular to have a sufficient size to close the disc-access aperture 113 and a supporting portion 117 formed at the base end of the shutter portion 116 to have a generally C-shaped section.

The shutter member 115 is provided movably in the directions of arrows A and B in FIG. 2 to open and close the disc-access aperture 113 with the shutter portion 116 extended over the disc-access aperture 113 and the supporting portion 117 being supported on part of the upper half 103 at the one lateral side 109 of the cartridge body 105.

Also, the shutter member 115 has formed therein an engagement hole 118 in which part of a shutter member supporting mechanism, provided at the disc recorder/player as will be described in detail later, is engaged. The engagement hole 118 is formed on part of the supporting portion 117 opposite to the one lateral side 109 of the cartridge body 105.

Further, the first disc cartridge 101 included in this embodiment has provided thereon a shutter member locking mechanism 119 to limit the movement of the shutter member 115 once moved to a position to close the disc-access aperture 113. The shutter member locking mechanism 119 has a locking lever 120 supported pivotably on the cartridge body 105 or shutter member 115. The locking lever 120 has a locking portion 121 provided at the free end thereof, and is forced to turn about a pivot 120a provided at the base end in the direction of arrow C in FIG. 1 for the locking portion 121 to project at the one lateral side 109 of the cartridge body 105. When the locking lever 120 is pivoted in the direction of arrow C in FIG. 1, the locking portion 121 is engaged into the engagement hole 118 formed in the shutter member 115 having been moved to the position to close the disc-access aperture 113 and thus locks the shutter member 115 in the position to close the disc-access aperture 113.

In the shutter member locking mechanism 119, when the locking lever 120 is pivoted against the force of a forcing member in a direction opposite to the direction of arrow C in FIG. 1 until the locking portion 121 thereof is disengaged from the engagement hole 118, the shutter member 115 is unlocked for movement in a direction to open the disc-access aperture 113.

Note that some of the disc cartridges 101 of the first type provided with the shutter member 115 have a forcing member to move the shutter member 115 in a direction to close the disc-access aperture 113.

Also, at the one lateral side 109 of the cartridge body 105, there is provided a moving-piece guide recess 122 in which a shutter member moving piece provided at the disc recorder/player is to be engaged. The moving-piece guide recess 122 is formed along the one lateral side 109 to extend over a portion of the circular front side 107 as shown in FIG. 1.

At the other lateral side 110 of the cartridge body 105 opposite to the one lateral side 109 at which the shutter member 115 is supported, there is provided an incorrect-insertion preventiverecess 123 to prevent the first disc cartridge 101 from being incorrectly inserted with the upside-down into the disc recorder/player. As shown in FIG. 1, the incorrect-insertion preventive recess123 is formed along the other circular front side 110 to the middle of the lateral side 107 toextend over a portion of the circular front side 107.

If the first disc cartridge 101 is incorrectly inserted with the upside down into the disc recorder/player, the shutter member moving piece as an incorrect-insertion preventive piece enters, and is engaged in, the incorrect-insertion preventive recess 123 to limit further insertion of the disc cartridge 101 into the disc recorder/player.

Next, a disc cartridge of the aforementioned second type, also compatible with the disc recorder/player according to the present invention, with which the first disc cartridge 101 with the shutter member 115 is compatible as having been described above, will be explained with reference to FIGS. 3 and 4. The second disc cartridge is generally indicated with a reference numeral 201.

The second disc cartridge 201 is not provided with any shutter member to open and close a disc-access aperture, and thus the disc-access aperture is left open. Since the second disc cartridge 201 is formed to have the same profile as the aforementioned first disc cartridge 101, it is compatible with, or it can be loaded into, the disc recorder/player with which the first disc cartridge 101 is compatible. The second disc cartridge 201 is also similar in other basic construction to the first disc cartridge 101. Therefore, the same components of the second disc cartridge 201 as those of the first disc cartridge 101 are indicated with the same reference numerals as those used in description and illustration of the first disc cartridge 101 and will not be described in detail any more.

Figure 3:
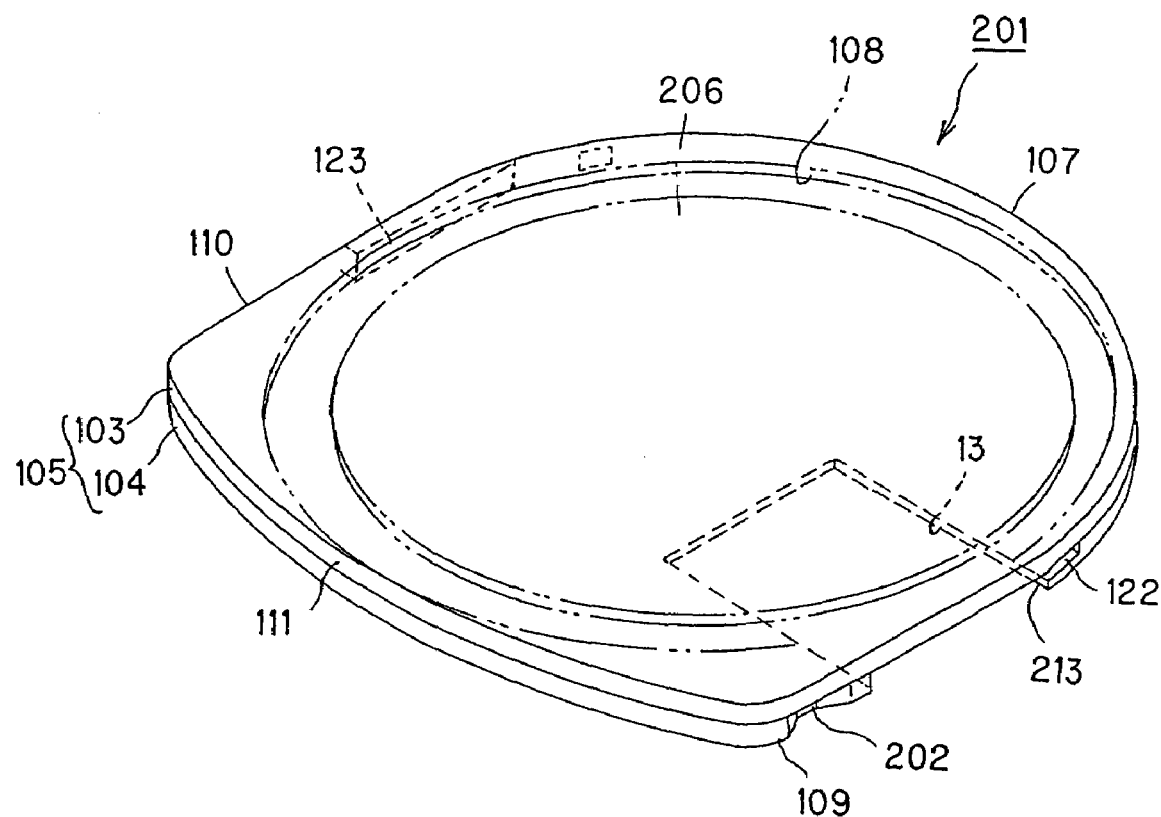
FIG. 3 is a perspective view, from the lower half, of the second disc cartridge also compatible with the disc recording and/or playback apparatus according to the present invention.
Figure 4:
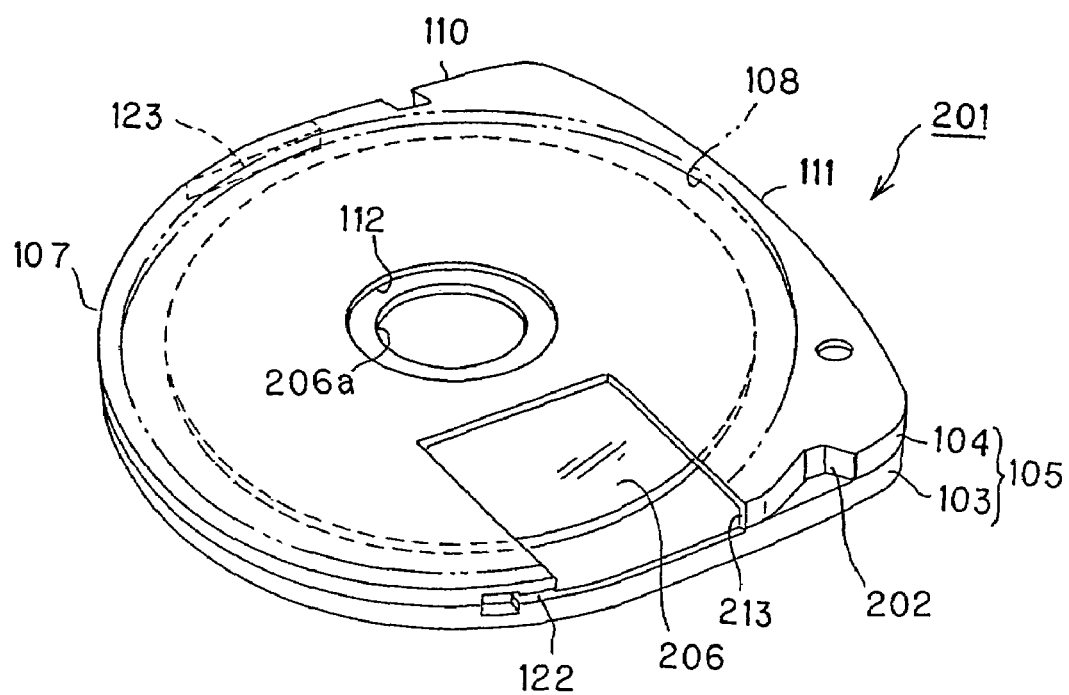
FIG. 4 is a perspective view, from the lower half, of the second disc cartridge in FIG. 3.

As in the first disc cartridge 101, the second disc cartridge 201 provided with no shutter member includes a body 105 formed from a pair of upper and lower body halves 103 and 104 butt-joined to each other and which houses an optical disc 206 rotatably therein as shown in FIGS. 3 and 4.

Also in this disc cartridge 201, the lower half 104 as the bottom of the cartridge body 105 has formed at the center thereof a circular central opening 112 through which a central hole 206a formed at the center of the optical disc 206 housed in the cartridge body 105 and its rim are exposed to outside, as shown in FIG. 4.

As shown in FIG. 4, the lower half 104 has also formed therein a disc-access aperture 213 through which the optical head is to access the optical disc for write and/or read of information signals to and/or from the latter. The disc-access aperture 213 is also located at one (109) of the lateral sides (109 and 110) of the cartridge body 105 similarly to the disc-access aperture 113 formed in the first disc cartridge 101, and formed rectangular to extend from a position near the central opening 112 to the one lateral side 109. This disc-access aperture 213 is also open at the one lateral side 109 of the cartridge body 105 as shown in FIG. 4.

Since the second disc cartridge 201 is not provided with any shutter member, it has no recess and the like for supporting the shutter member as in the first disc cartridge 101.

Also in the second disc cartridge 201, at the one lateral side 109 of the cartridge body 105, there is provided a moving-piece guide recess 122 in which a shutter member moving piece provided at the disc recorder/player is to be engaged. The moving-piece guide recess 122 is intended to enable disc loading of the first disc cartridge 101 having the shutter member 115 installed thereon into the disc recorder/player by preventing the disc cartridge from interfering with the shutter member moving piece provided at the disc recorder/player with which the first disc cartridge 101 is compatible.

Note that since the second disc cartridge 201 has no shutter member that closes the disc-access aperture 213, it will not be applied with any pressure from the shutter member supporting mechanism when it is loaded into the disc recorder/player, which will be described in detail later.

Also, the second disc cartridge 201 has formed therein a concavity 202 to avoid the pressure of the shutter member supporting mechanism when it is loaded into the disc recorder/player. That is, when the second disc cartridge 201 is loaded into the disc recorder/player, part of the shutter member supporting mechanism will enter the concavity 202 as shown in FIG. 4.

The concavity 202 is formed as a cut formed at a portion, at the one lateral side 109, of the lower half 104 of the cartridge body 105. In order to avoid the pressure of the shutter member supporting mechanism, the concavity 202 is formed to have such a shape and depth as prevents part of the shutter member supporting mechanism from touching the cartridge body 105.

As in the first disc cartridge 101, the second disc cartridge 201 has provided at the other lateral side 110 of the cartridge body 105 opposite to the one lateral side 109 an incorrect-insertion preventive recess 123 to prevent the second disc cartridge 201 from being incorrectly inserted with the upside down into the disc recorder/player.

Next, the disc recorder/player compatible with both the first and second disc cartridges 101 and 201 constructed as above will be illustrated and explained.

Figure 5:
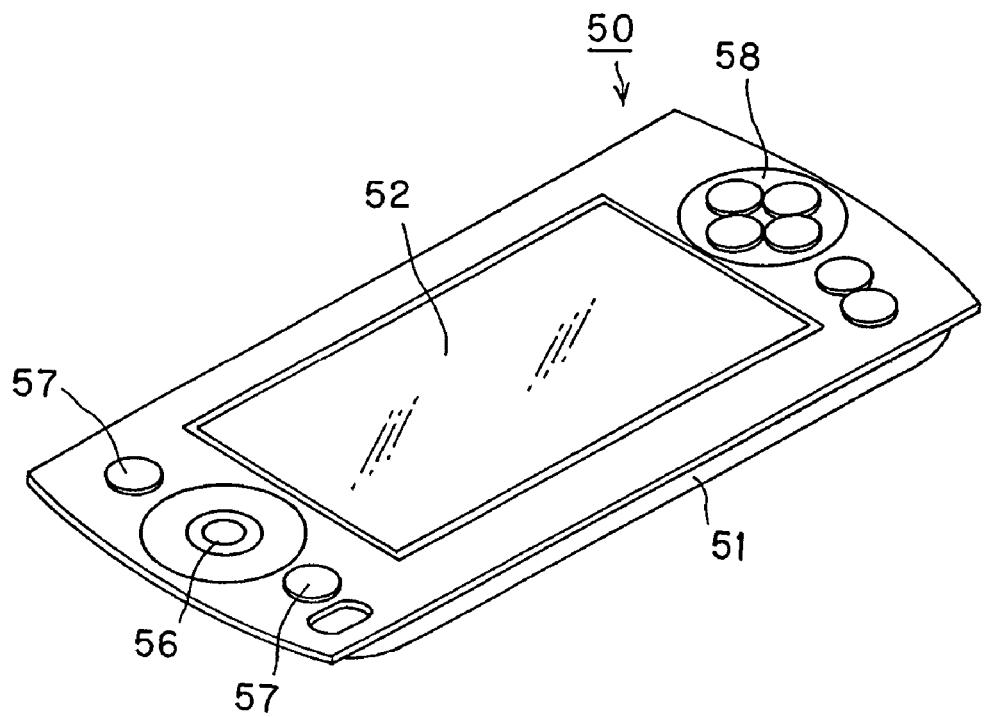
FIG. 5 is a perspective view, from the display, of an embodiment of the disc recording and/or playback apparatus according to the present invention.
Figure 6:
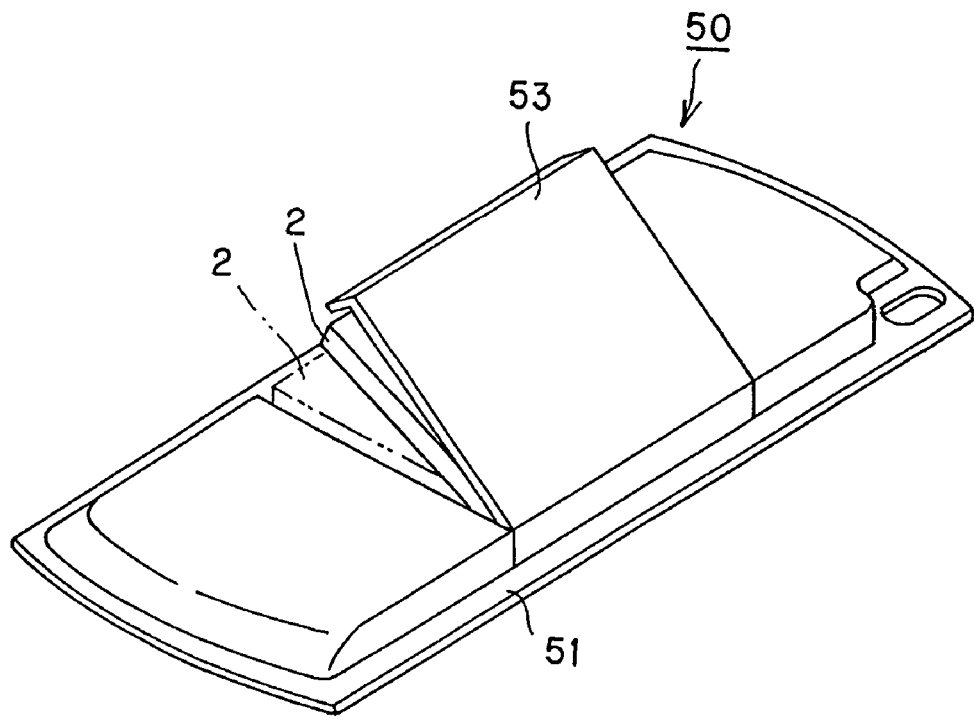
FIG. 6 is a perspective view, from the cartridge holder, of the disc recording and/or playback apparatus in FIG. 5.

As shown in FIGS. 5 and 6, the disc recorder/player, generally indicated with a reference numeral 50, includes a disc drive 51 in which either the first or second disc cartridge 101 or 201 is to selectively be loaded. The disc drive 51 incorporates a write and/or read unit to write information signals to the optical disc 106 or 206 housed in the first or second disc cartridge 101 or 201 or reads information signals recorded in the optical disc 106 or 206.

As shown in FIG. 5, the disc drive 51 has a display 52 to display image data and character data read from the optical disc 106 or 206.

The disc drive 51 has a controller to control the overall operation of the disc drive 51. The disc drive 51 controls the write and/or read unit and display 52.

The disc drive 51 includes a loading mechanism 1 (see FIG. 7) for loading the first or second disc cartridge 101 or 201 into the write and/or read unit. As will be described in detail later, the loading mechanism 1 includes a cartridge holder 2 to hold and load the first or second disc cartridge 101 or 201 into the write and/or read unit. The cartridge holder 2 is supported on a base to move between a position to insert or eject the first or second disc cartridge 101 or 201 and a position to load the optical disc 101 or 201 into the write and/or read unit provided in the disc drive 51.

The disc drive 51 has a cover 53 to cover the cartridge holder 2. The cover 53 covers the cartridge holder 2 to close the disc drive 51 when the cartridge holder 2 has been pivoted to the position to load the first or second disc cartridge 101 or 201 into the write and/or read unit.

Note that the disc drive 51 has provided thereon an eject button (not shown) to eject the disc cartridge 101 or 201 from the cartridge holder 2.

On the opposite front sides, across the display 52, of the disc drive 51, there are provided a plurality of control buttons 56 and 57 to execute a program read by the write and/or read unit and a control key 58 to scroll an image displayed on the display 52.

In addition, the disc drive 51 has provided thereon a write or read control button for controlling the disc drive and a power on/off button (not shown).

The loading mechanism for loading the first or second disc cartridge 101 or 201 into the write and/or read unit provided in the aforementioned disc recorder/player will be described in detail below.

Figure 7:
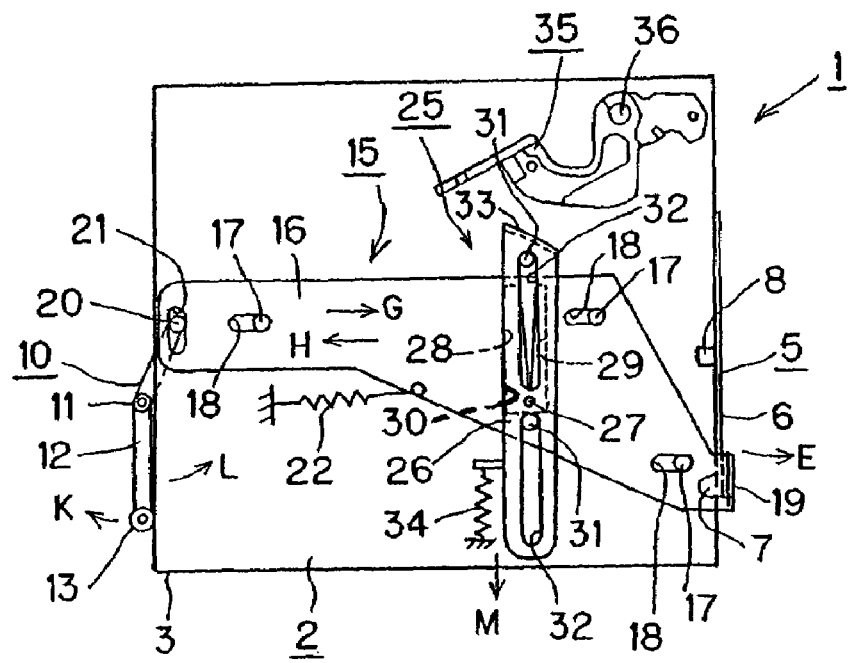
FIG. 7 is a plan view of the disc cartridge loading mechanism including the cartridge holder included in the disc recording and/or playback apparatus according to the present invention.

As shown in FIG. 7, the loading mechanism 1 includes a cartridge holder 2 to hold the first or second disc cartridge 101 or 201 and load the optical disc 106 or 206 housed in the first or second disc cartridge 101 or 201 into the write and/or read unit. The cartridge holder 2 is provided on a base (not shown) on which the write and/or read unit is provided. The cartridge holder 2 is supported on the base to be movable between a position to insert or eject the first or second disc cartridge 101 or 201 and a position to load the optical disc 106 or 206 into the write and/or read unit The cartridge holder 2 has a cartridge slot 3 through which the first or second disc cartridge 101 or 201 is to be inserted or ejected. The cartridge holder 2 holds the first or second disc cartridge 101 or 201 inserted through the cartridge slot 3, mounts it onto a cartridge loader in the disc recorder/player, and loads the optical disc 106 or 206 housed in the first or second disc cartridge 101 or 201 into the write and/or read unit.

The cartridge holder 2 has provided at one lateral side thereof a shutter member supporting mechanism 5 that is to be engaged on the shutter member 115 provided on the first disc cartridge 101 when the latter is inserted to limit the movement of the shutter member 115. The shutter member supporting mechanism 5 includes a shutter member supporting piece 6 made of a leaf spring that is an elastic material as shown in FIG. 7. The shutter member supporting piece 6 has provided at the free end thereof a pressing piece 7 that is to be pressed by the first or second disc cartridge 101 or 201 inserted into the cartridge holder 2 and engaged in an engagement hole 118 formed in the shutter member 115 provided on the first disc cartridge 101.

As shown in FIG. 7, the shutter member supporting piece 6 is installed with the pressing piece 7 at the free end being located by the side of the cartridge slot 3 and the base end thereof being fixed to the one lateral side of the cartridge holder 2. It should be noted that the shutter membersupporting piece 6 is installed outside the one lateral side of the cartridge holder 2 with the pressingpiece 7 being projected in the cartridge holder 2. Since the pressing piece 7 is pressed by the first orsecond disc cartridge 10l or 201 being inserted into the cartridge holder 2, the shuttermember supporting piece 6 is resiliently displaced about the base end fixed to the cartridge holder 2in a direction away from the cartridge holder 2 (in the direction of arrow E in FIG. 7).

Note here that when the first disc cartridge 101 is inserted into the cartridge holder 2, the shutter member supporting piece 6 will be displaced more than when at least the second disc cartridge 201 is inserted. More specifically, when the first disc cartridge 101 is inserted into the cartridge holder 2, the pressing piece 7 will ride on the shutter member 115 closing the disc-access aperture 113 as will be described in detail later, so that the shutter member supporting piece 6 will be displaced more than when the second disc cartridge 201 without any shutter member is inserted.

When the first disc cartridge 101 is inserted into the cartridge holder 2, the shutter member supporting piece 6 will ride on the shutter member 115 provided on the first disc cartridge 101 and thus resiliently displaced. Then, when the first disc cartridge 101 is further inserted into the cartridge holder 2, the shutter member supporting piece 6 will be resiliently returned to its initial position to engage the pressing piece 7 into the engagement hole 118 formed in the shutter member 115 and thus supports the shutter member 115, to thereby limit the shutter member 115 from moving in relation to the cartridge body 105.

Also, when the first disc cartridge 101 with the shutter member locking mechanism 119 is inserted into the cartridge holder 2, the pressing piece 7 will press the lockingportion 121 while being engaged in the engagement hole 118 to turn the locking lever 120 in thedirection opposite to the direction of arrow C in FIG. 1 and thus unlock the shutter member 115 formovement relative to the cartridge body 105.

At the one lateral side of the cartridge holder 2 at which the shutter member supporting mechanism 5 is provided, there is provided a shutter member moving piece 8 that is to be engaged in the moving-piece guide recess 122 formed in the first or second disc cartridge 101 or 201.

Note that the shutter member moving piece 8 is provided in a deeper position in the cartridge holder 2 than the pressing piece 7 of the shutter member supporting mechanism 5.

When the first disc cartridge 101 is inserted in the cartridge holder 2, the shutter member supporting piece 6 supports the shutter member 115 and moves in relation to the cartridge body105 to open the disc-access aperture 113. Also, when the first or second disc cartridge 101 or 201 isinserted with the upside down into the cartridge holder 2, the shutter member moving piece 8 willbe engaged into the incorrect-insertion preventive recess 123 to prevent further insertion of the firstor second disc cartridge 101 or 201 into the cartridge holder 2. Namely, the shutter member movingpiece 8 will prevent incorrect insertion of the disc cartridge.

Further, the disc recording/player according to the present invention includes a pressing mechanism 10 to press the second disc cartridge 201 inserted in the cartridge holder 2. The pressing mechanism 10 is provided at the other lateral side of the cartridge holder 2, opposite to the one lateral side of the cartridge holder 2 at which the shutter member supporting mechanism 5 as shown in FIG. 7. The pressing mechanism 10 includes a pivoting lever 12 supported pivotably about a pivot 11 as shown in FIG. 7. The pivoting lever 12 has provided at one end thereof a pressing piece 13 that enters the cartridge holder 2.

Further, the disc recorder/player according to the present invention includes a pressing controlling mechanism 15 that controls the position of the pressing mechanism 10 correspondingly to the type of a disc cartridge inserted into the cartridge holder 2 and presses, by means of the pressing mechanism 10, the disc cartridge 101 inserted into the cartridge holder 2 or removes the pressure applied by the pressing mechanism 10.

More specifically, the pressing controlling mechanism 15 is associated with the shutter member supporting mechanism 5. When the first disc cartridge 101 is inserted into the cartridge holder 2, the shutter member supporting mechanism 5 is displaced to move the pressing controlling mechanism 15 which will thus change the position of the pressing mechanism 10, thereby removing the pressure applied to the first disc cartridge 101. When the second disc cartridge 201 is inserted into the cartridge holder 2, the pressing controlling mechanism 15 will control the pressing mechanism 10 to press the second disc cartridge 201.

The above pressing controlling mechanism 15 includes a control lever 16 provided above the cartridge holder 2 and between the shutter member supporting mechanism 5 disposed at the one lateral side of the cartridge holder 2 and the pressing mechanism 10 disposed at the other lateral side of the cartridge holder 2. The control lever 16 is installed to engage a plurality of sliding guide shafts 17 provided on the cartridge holder 2 into a plurality of elongated sliding guide holes 18, respectively, and move between the shutter member supporting mechanism 5 and pressing mechanism 10. That is, the control lever 16 is installed on the cartridge holder 2 to be movable in the directions of arrows G and H in FIG. 7.

At one end of the control lever 16, there is formed a control lever moving piece 19 associated with the shutter member supporting piece 6 of he shutter member supporting mechanism 5. The control lever moving piece 19 is formed by bending the one end of the control lever 16 to overlap the free end of the shutter member supporting piece 6 where the pressing piece 7 is formed.

Also, the other end of the pivoting lever 12 of the pressing mechanism 10 is connected to the other end of the control lever 16. The pivoting lever 12 is installed with a connecting pin 20 provided at the other end thereof being engaged in a connecting hole 21 formed elongated in the other end of the control lever 16. The pivoting lever 12 thus connected to the control lever 16 is turned about the pivot 11 in the direction of arrow K or L in FIG. 7 when the control lever 16 is moved in the direction of arrow G or H in FIG. 7.

Note that the control lever 16 is forced by a tension spring 22 provided between the control lever 16 and cartridge holder 2 in the direction of arrow H in FIG. 7 to have the control lever moving piece 19 abut the shutter member supporting piece 6. That is, the control lever 16 supports, by pressing, the free end of the shutter member supporting piece 6 for the pressing piece 7 to project into the cartridge holder 2.

When the control lever 16 is moved in the direction of arrow H in FIG. 7, the pivoting lever 12 is turned about the pivot 11 in the direction of arrow L in FIG. 7 to project the pressing piece 13 into the cartridge holder 2. Thus, the pressing controlling mechanism 15 can press the disc cartridge 101 being inserted into the cartridge holder 2 by means of the pivoting lever 12 pivoted as above.

Also, when the first disc cartridge 101 is inserted in the cartridge holder 2 and shutter member supporting piece 6 is resiliently displaced by the shutter member 115 provided on the disc cartridge 101 in the direction of arrow E in FIG. 7, the control lever moving piece 19 is pressed by the free end of the shutter member supporting piece 6 and the control lever 16 is moved against the force of the tension spring 22 in the direction of arrow G in FIG. 7. When the control lever 16 is thus moved in the direction of arrow G in FIG. 7, the pivoting lever 12 is turned about the pivot 11 in the direction of arrow K in FIG. 7 to have the pressing piece 13 go out of the cartridge holder 2 to remove the pressure applied to the first disc cartridge 101 being inserted into the cartridge holder 2.

As above, the pressing controlling mechanism 15 controls the pressing mechanism 10 depending upon the difference in distance of displacement of the shutter member supporting mechanism 5 to detect which the disc cartridge being inserted and to be pressed is, first or second disc cartridge 101 or 201. More specifically, since the distance of displacement of the shutter member supporting mechanism 5 when the first disc cartridge 101 is inserted into the cartridge holder 2 is different from that when the second disc cartridge 201 is inserted, it is detected which the disc cartridge being inserted into the cartridge holder 2 is, first (101) or second (201), that is, it is selected whether the disc cartridge being inserted into the cartridge holder 2 is to be pressed or not.

As above, the distance of displacement of the shutter member supporting mechanism 5 when the first disc cartridge 101 is inserted into the cartridge holder 2 is different from that when the second disc cartridge 201 is inserted, and the control lever 16 of the pressing controlling mechanism 15 is moved over a distance correspondingly to the distance of displacement of the shutter member supporting mechanism 5. The disc recorder/player according to the present invention includes also a control lever locking mechanism 25 to lock the control lever 16 in either of the positions to which the control lever 16 has been moved depending upon which the disc cartridge inserted into the cartridge holder 2 is, first or second.

The control lever locking mechanism 25 includes a sliding lever 26 installed on the cartridge holder 2 to slide being pressed by the first or second disc cartridge 101 or 201 being inserted into the cartridge holder 2, and first and second engagement recesses 28 and 29 in a selected one of which an engagement projection 27 provided on the sliding lever 26 is to be engaged.

The sliding lever 26 is installed movably on the cartridge holder 2. More specifically, the sliding lever 26 has formed therein a pair of elongated sliding guide holes 32, and it is installed to be movable in the inserting/ejecting direction of the first or second disc cartridge 101 or 201 into/from the cartridge holder 2 with a pair of sliding guide shafts 31 provided on the cartridge holder 2 being engaged in the pair of sliding guide holes 32, respectively. The sliding lever 26 has provided at one end thereof a pressing piece 33 that is to be pressed by the first-inserted side of the first or second disc cartridge 101 or 201 being inserted into the cartridge holder 2. The pressing piece 33 is formed circular correspondingly to the front side 107 of the first or second disc cartridge 101 or 201, at which the latter is first inserted into the cartridge holder 2. The sliding lever 26 is forced by the tension spring 34 provided between itself and cartridge holder 2 to move in an ejecting direction (direction of arrow M in FIG. 7) opposite to the direction in which the first or second disc cartridge 101 or 201 is to be inserted into the cartridge holder 2.

The first and second engagement recesses 28 and 29 in one of which the engagement projection 27 is to be engaged are formed by cutting a portion of the control lever 16. The first and second engagement recesses 28 and 29 are formed in the moving direction of the sliding lever 26 perpendicular to the moving direction of the control lever 16. The first engagement recess 28 is so formed that when the pressing piece 7 is pressed by the shutter member 115 on the first disc cartridge 101 inserted in the cartridge holder 2, the shutter member moving piece 8 is thus resiliently displaced in the direction of arrow E in FIG. 7 and the control lever 16 is moved in the direction of arrow G in FIG. 7, the engagement projection 27 on the sliding lever 26 will face the open end. Also, the second engagement recess 29 is so formed that when the control lever 16 is in its initial position with the shutter member moving piece 8 being not resiliently displaced, the engagement projection 27 on the sliding lever 26 will face the open end.

Note that the base end sides of the first and second engagement recesses 28 and 29 are formed together as a recess 30 in which the engagement projection 27 is to be engaged. That is, the first and second engagement recesses 28 and 29 are formed each as a branch of the recess 30.

When the engagement projection 27 on the sliding lever 26 to be slid by the first or second disc cartridge 101 or 201 inserted into the cartridge holder 2 is engaged into either of the first and second engagement recess 28 and 29, the control lever 16 is fixed in a position to which it has been moved by the shutter member 115 or in its initial position.

Also, the disc recorder/player according to the present invention includes an ejection lever 35 to eject the first or second disc cartridge 101 or 201 from inside the cartridge holder 2. The ejection lever 35 is installed on the base to be pivotable about a pivot 36. When the ejection lever 35 is pivoted being pressed by the first or second disc cartridge 101 or 201 inserted into the cartridge holder 2, a spring member associated with the ejection lever 35 will correspondingly store a force that acts in a direction to eject the first or second disc cartridge 101 or 201 from inside the cartridge holder 2. The ejection lever 35 is pivoted under the action of the force released from the spring member to eject the first or second disc cartridge 101 or 201 from inside the cartridge holder 2.

Next, there will be explained loading of the first or second disc cartridge 101 or 201 into the disc recorder/player constructed as above according to the present invention.

First, the first disc cartridge 101 provided with the shutter member 115 is loaded into the disc recorder/player.

The first disc cartridge 101 is inserted first at the circular front side 107 thereof into the cartridge holder 2 from the cartridge slot 3.

Because the front side 107 of the first disc cartridge 101, at which the latter is first inserted into the cartridge holder 2, is formed circular, the pressing piece 7 will face the circular front side 107 and not yet touch the first disc cartridge 101 and the shutter member supporting mechanism 5 will not be put into action during the initial phase of insertion into the cartridge holder 2.

Figure 8:
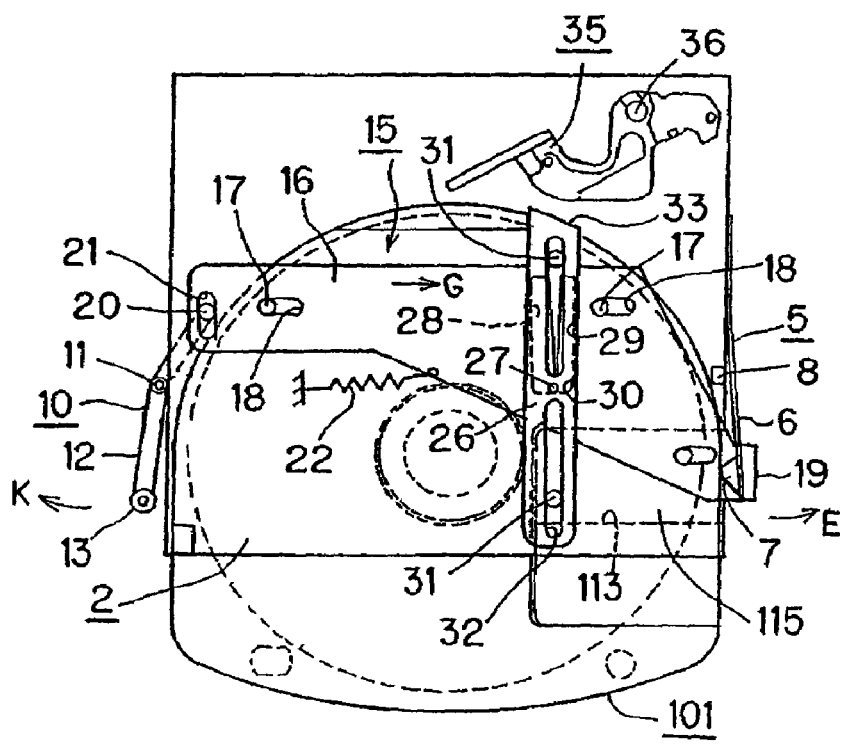
FIG. 8 is a plan view of the first disc cartridge inserted in the cartridge holder.

As shown in FIG. 8, when the first disc cartridge 101 is further inserted to the middle of the cartridge holder 2, the pressing piece 7 will ride on the shutter member 115 and the shutter member supporting piece 6 will resiliently be displaced in the direction of arrow E in FIG. 8. Due to the resilient displacement of the shutter member supporting piece 6, the control lever 16 will be moved in the direction of arrow G in FIG. 8. With this movement of the control lever 16 in the direction of arrow G in FIG. 8, the pivoting lever 12 of the pressing mechanism 10 is turned about the pivot 11 in the direction of arrow K in FIG. 8 to take away the pressing piece 13 from inside the cartridge holder 2 in order to apply no pressure to the first disc cartridge 101 inserted in the cartridge holder 2.

At this time, the sliding lever 26 has the pressing piece 33 thereof pressed by the circular front side 107 of the first disc cartridge 101 so that the engagement projection 27 will be slid to a position where it is opposite to the open end of the first engagement recess 28 formed in the control lever 16 as shown in FIG. 8.

Figure 9:
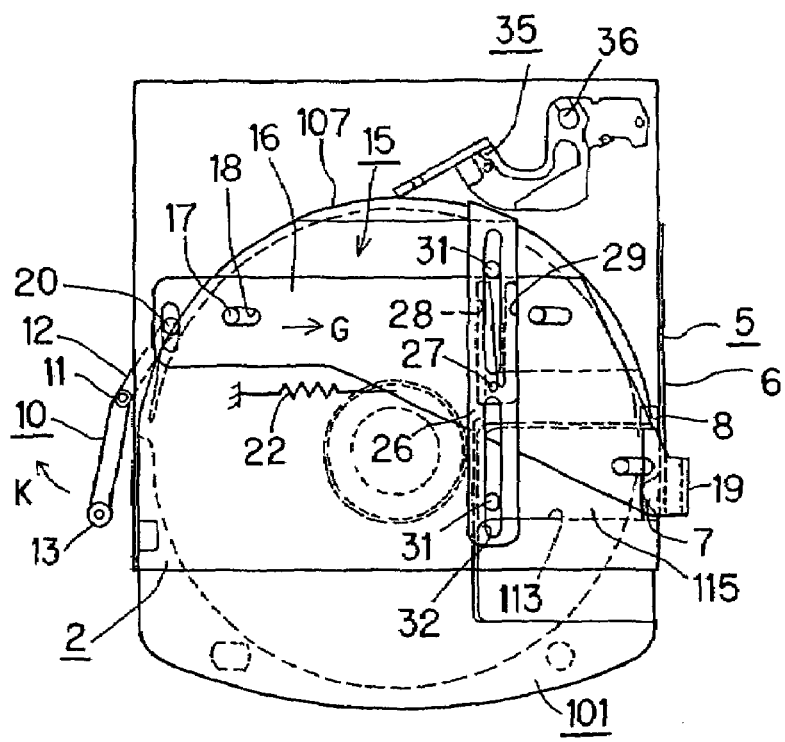
FIG. 9 is a plan view of the shutter member supporting mechanism engaged on the shutter member provided on the first disc cartridge.

As the first disc cartridge 101 is further inserted into the cartridge holder 2, the pressing piece 7 formed at the free end of the shutter member supporting piece 6 is engaged in the engagement hole 118 formed in the shutter member 115 as shown in FIG. 9. That is, the shutter member supporting piece 6 having largely been displaced with the pressing piece 7 riding on the shutter member 115 is resiliently return toward its initial position and the pressing piece 7 is engaged in the engagement hole 118 to limit the movement of the shutter member 115.

Note that also with the pressing piece 7 being engaged in the engagement hole 118, the first disc cartridge 101 is still applied with a pressure from the shutter member supporting piece 6. That is, in this embodiment, when the pressing piece 7 is engaged in the engagement hole 118, the shutter member supporting piece 6 is slightly resiliently displaced to support the first disc cartridge 101 by pressing.

When the pressing piece 7 is engaged in the engagement hole 118, the locking portion 121 is pressed by the pressing piece 7, the locking lever 120 is pivoted in the direction opposite to the direction of arrow C in FIG. 1 to unlock the shutter member 115 and thus enable the latter to be movable in relation to the cartridge body 105.

When the first disc cartridge 101 is inserted into the cartridge holder 2 until the pressing piece 7 is engaged in the engagement hole 118, the sliding lever 26 is also pressed by the first disc cartridge 101 to slide in the inserting direction to engage the engagement projection 27 into the first engagement recess 28 as shown in FIG. 9. Thus, even with the shutter member supporting piece 6 being resiliently returned to its initial position, the control lever 16 is fixed in a position to which it has been moved by the shutter member supporting piece 6. Since the control lever 16 is fixed as having been moved in the direction of arrow G in FIG. 9, the pressure from the pressing mechanism 10 is limited from being applied to the first disc cartridge 101.

Figure 10:
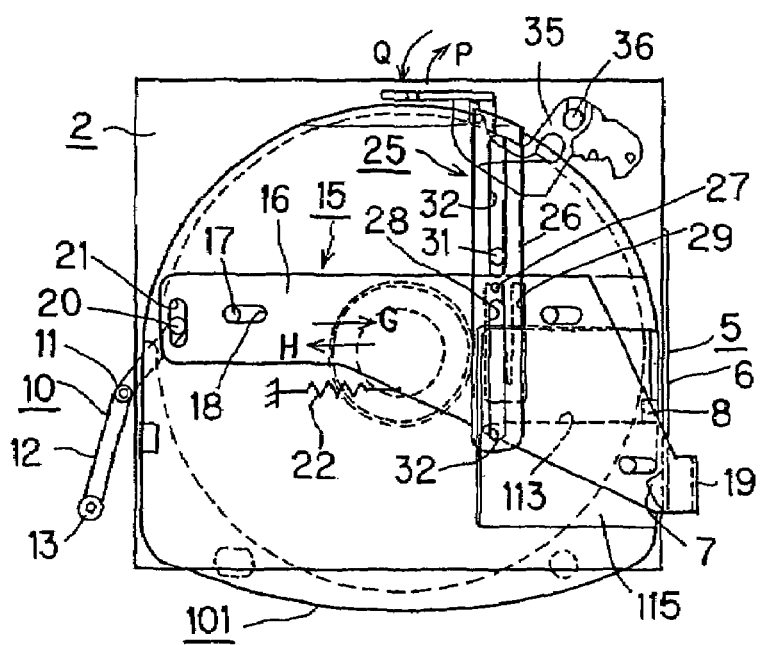
FIG. 10 is a plan view of the first disc cartridge inserted in the cartridge holder.

As the first disc cartridge 101 is further inserted into the cartridge holder 2 after the pressing piece 7 is engaged in the engagement hole 118, the shutter member moving piece 8 goes into the moving-piece guide recess 122 formed in the cartridge body 105 to support, by pressing, the unlocked shutter member 115 as shown in FIG. 10. As the first disc cartridge 101 is further inserted into the cartridge holder 2, the cartridge body 105 will be moved in relation to the shutter member 115, the disc-access aperture 113 be opened and the first disc cartridge 101 is set in position in the cartridge holder 2.

Since the engagement projection 27 is engaged in the first engagement recess 28 at this time, the control lever 16 is fixed in a position to which it has been moved by the shutter member supporting piece 6 to limit the first disc cartridge 101 from being pressed by the pressing mechanism 10.

Also, since the shutter member 115 is supported being pressed by the shutter member supporting piece 8 with the pressing piece 7 being engaged in the engagement hole 118, the shutter member 115 is limited from freely moving, positively held in a position to open the disc-access aperture 113, and the first disc cartridge 101 with the shutter member locking mechanism 119 has the locking piece 121 thereof held in a position where it is disengaged from the engagement hole 118.

When the first disc cartridge 101 is further inserted into place in the cartridge holder 2, the ejection lever 35 will be turned about the pivot 36 in the direction of arrow P in FIG. 10 and the spring member associated with the ejection lever 35 stores a force correspondingly.

Figure 11:
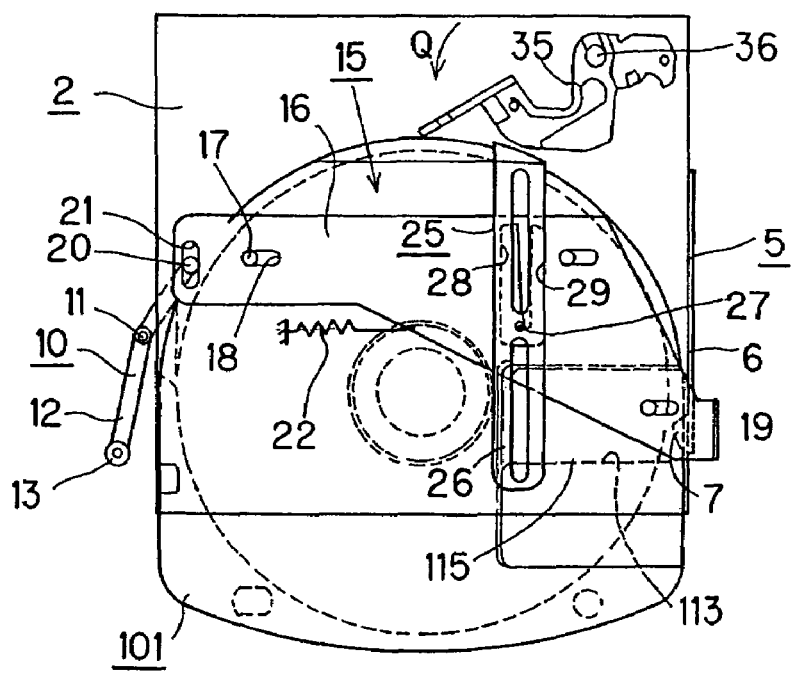
FIG. 11 is a plan view of the first disc cartridge ejected from in the cartridge holder.

To eject the first disc cartridge 101 from inside the cartridge holder 2, the ejecting mechanism provided at the disc recorder/player is activated to release the force stored in the spring member in order to pivot the ejection lever 35 in the direction of arrow Q in FIG. 11. When the ejection lever 35 is pivoted in the direction of arrow Q in FIG. 11, it presses the first disc cartridge 101. Thus, the first disc cartridge 101 will be moved in a direction of ejection from inside the cartridge holder 2. Since the pressing piece 7 is still engaged in the engagement hole 118 at this time, the shutter member 115 will be limited from moving and only the cartridge body 105 be moved in the direction of ejection from inside the cartridge holder 2 and the shutter member 115 close the disc-access aperture 113 as shown in FIG. 11.

Also, since the engagement projection 27 is left engaged in the first engagement recess 28 until the first disc cartridge 101 is pressed by the ejection leer 35 to arrive at the position of ejection from inside the cartridge holder 2, the control lever 16 is fixed in the position to which it has been moved by the shutter member supporting piece 6 to limit application of the pressure from the pressing mechanism 10 to the first disc cartridge 101.

As shown in FIG. 11, to eject, from the cartridge holder 2, the first disc cartridge 101 having been moved to the ejecting position, the pressing piece 7 is disengaged from the engagement hole 118 and rides on the shutter member 115 to displace the shutter member supporting piece 6 largely. Further, when the first disc cartridge 101 is thus taken out of the cartridge holder 2, the pressing piece 7 leaves the shutter member 115 and the shutter member supporting piece 6 is resiliently returned to its own initial position. Then, the control lever 16 is also returned under the force of the tension spring 22 to its initial position and also the pivoting lever 12 of the pressing mechanism 10 is returned to its initial position where the pressing piece 13 is projected into the cartridge holder 2, as shown in FIG. 7. Also, the sliding lever 26 of the control lever locking mechanism 25 is returned to its initial position.

As above, when the first disc cartridge 101 is inserted into the cartridge holder 2 of the disc recorder/player according to the present invention, the pressing mechanism 10 is controlled not to apply the pressure to the first disc cartridge 101. So, the first disc cartridge 101 will be applied with the pressure from the shutter member supporting mechanism 5 and thus loaded in the cartridge holder 2 as in the conventional disc recorder/player.

Next, there will be explained loading of the second disc cartridge 201 having no shutter member to close the disc-access aperture 213 into the disc recorder/player constructed as above according to the present invention.

The second disc cartridge 201 is inserted first at the circular front side 107 thereof into the cartridge holder 2 from the cartridge slot 3 similarly to the first disc cartridge 101.

Because the front side 107 of the second disc cartridge 201, at which the latter is first inserted into the cartridge holder 2, is formed circular as in the first disc cartridge 101, the pressing piece 7 will face the circular front side 107 and not yet touch the second disc cartridge 201 and the shutter member supporting mechanism 5 will not be put into action during the initial phase of insertion into the cartridge holder 2.

Figure 12:
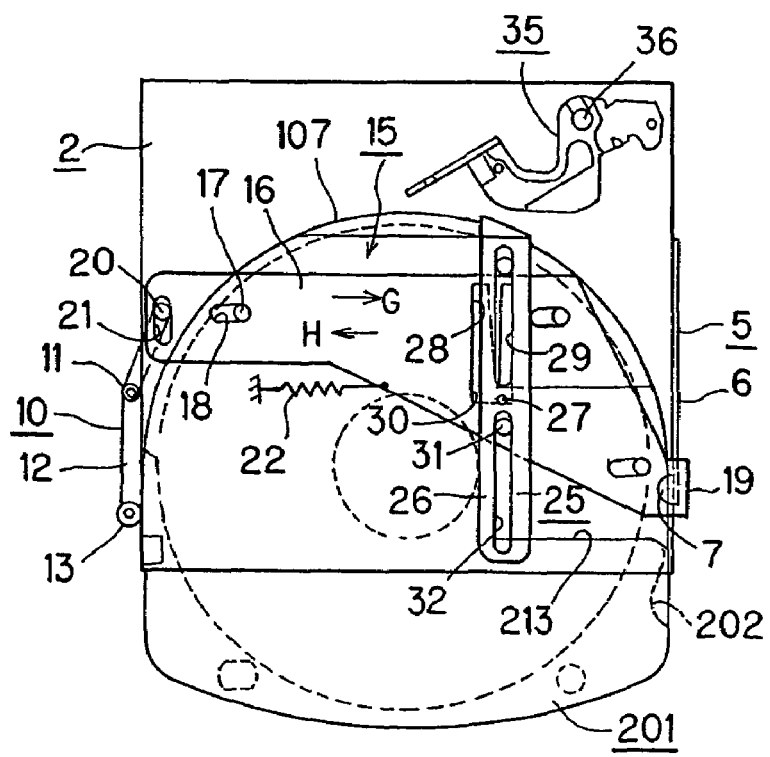
FIG. 12 is a plan view of the second disc cartridge inserted in the cartridge holder.

Since the pressing piece 7 projects toward the disc-access aperture 213 even when the second disc cartridge 201 has been inserted to a position where the pressing piece 7 will face the disc-access aperture 213 as shown in FIG. 12, the shutter member supporting piece 6 will be placed in its initial position without being resiliently displaced.

Note that since the disc-access aperture 213 in the second disc cartridge 201 is open at the one lateral side 109, the pressing piece 7 facing the disc-access aperture 213 will be pressed and thus the shutter member supporting piece 6 will not resiliently be displaced.

Even when the pressing piece 7 is inserted to a position, where it is opposite to the disc-access aperture 213, with the second disc cartridge 201 having been inserted in the cartridge holder 2, it will not make any pressing. So, the shutter member supporting piece 6 will resiliently be displaced to place the control lever 16 in its initial position without being moved against the force of the tension spring 22. Thus, with the pivoting lever 12 of the pressing mechanism 10 being turned about the pivot 11 in the direction of arrow L in FIG. 14 under the force of the tension spring 22 that forces the control lever 16, the pressing piece 13 is projected into the cartridge holder 2 to press the second disc cartridge 201 inserted in the cartridge holder 2 toward the one lateral side of the latter.

When the second disc cartridge 201 is inserted to a position where the pressing piece 7 faces the disc-access aperture 213 as shown in FIG. 12, the pressing piece 33 is pressed by the circular front side 107 of the second disc cartridge 201, and the sliding lever 26 also has the engagement projection 27 pressed by the circular front side 107 of the second disc cartridge 201 to slide to a position where the engagement projection 27 faces the open end of the second engagement recess 29 formed in the control lever 16 as shown in FIG. 12.

Note that the second disc cartridge 201 in this embodiment is inserted into the cartridge holder 2 until the pressing piece 7 faces the disc-access aperture 213, the pressing piece 7 abuts once the one lateral side 109 located at the circular front side 107 and then faces the inside of the disc-access aperture 213. At this time, the shutter member supporting piece 6 is resiliently displaced a little and the control lever 16 is moved in the direction of arrow G in FIG. 13 against the force of the tension spring 22. However, since the control lever 16 is movable without being locked by the control lever locking mechanism 25, the second disc cartridge 201 is further inserted into the cartridge holder 2 and the pressing piece 7 will face the disc-access aperture 213. Then, the pressing piece 7 is moved in the direction of arrow H in FIG. 12 under the force of the tension spring 22 and held in its initial position. Thus, the pivoting lever 12 is turned about the pivot 11 in the direction of arrow L in FIG. 13 to have the pressing piece 13 project into the cartridge holder 2, the pressing piece 13 presses the second disc cartridge 201 in the disc cartridge 2 toward the one lateral side of the cartridge holder 2 and keeps the second disc cartridge 201 being pressed.

Figure 13:
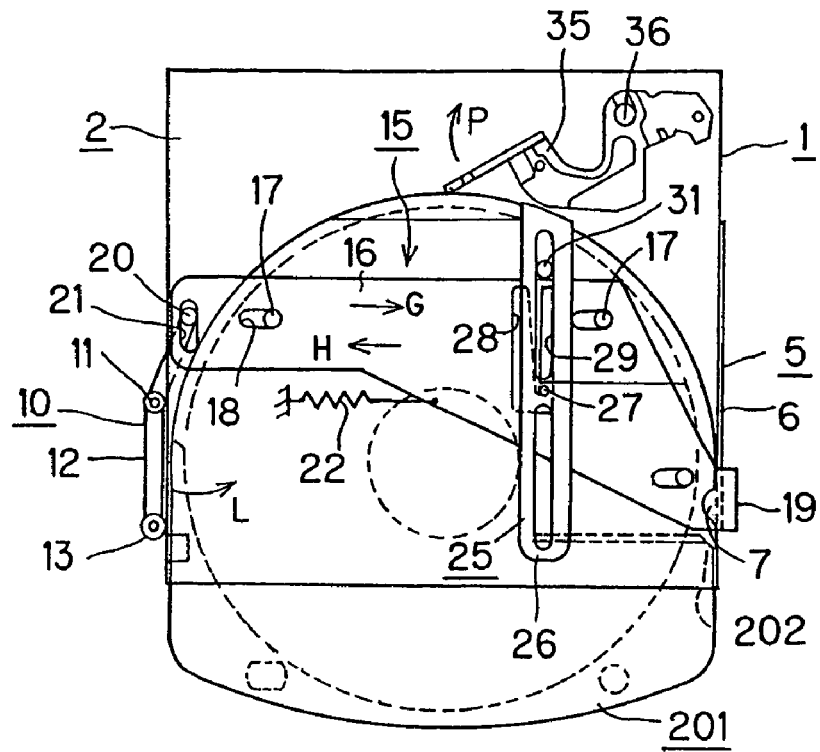
FIG. 13 is a plan view of the second disc cartridge being inserted halfway into the cartridge holder.

As the second disc cartridge 201 is further inserted into the cartridge holder 2, it presses the sliding lever 26 which will thus slide in the inserting direction and have the engagement projection 27 thereof engaged in the second engagement recess 29 as shown in FIG. 13. Then, the control lever 16 is moved by the tension spring 22 in the direction of arrow H in FIG. 14 and thus fixed in its initial position.

Figure 14:
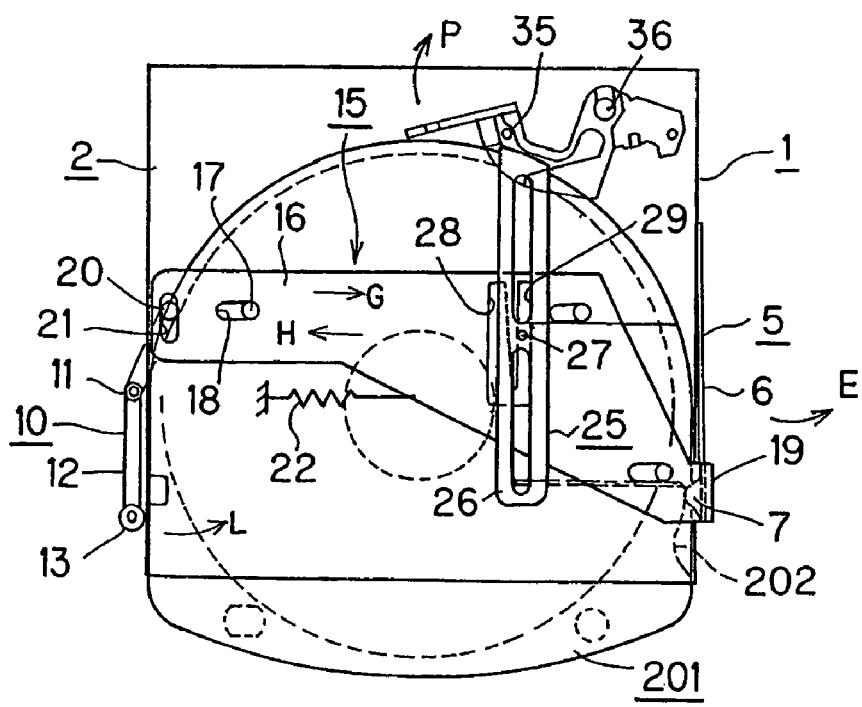
FIG. 14 is a plan view of the second disc cartridge further inserted into the cartridge holder.

When the second disc cartridge 201 is further inserted into the cartridge holder 2 from the position where the pressing piece 7 faces the disc-access aperture 213, the pressing piece 7 will move from that position and ride on the rear side 111, since the pressing piece 7 is pressed by the one lateral side 109 of the cartridge body 105, the shutter member supporting piece 6 is pressed to resiliently deform in the direction of arrow E in FIG. 14. The control lever 16 is applied with a force under which it is moved in the direction of arrow G against the force of the tension spring 22, but it will be retained in its initial position because the engagement projection 27 of the sliding lever 26 is engaged in the second engagement recess 29.

The resilient deformation of the shutter member supporting piece 6, caused by the pressing piece 7 riding on the rear side 111 of the cartridge holder 105 at the one lateral side 109, will be absorbed by deformation of the shutter member supporting piece 6, caused by the resilient member, or by clearance between the engagement projection 27 and second engagement recess 29. Thus, the control lever 16 is retained in its initial position even if it is moved in the direction of arrow G against the force of the tension spring 22.

Figure 15:
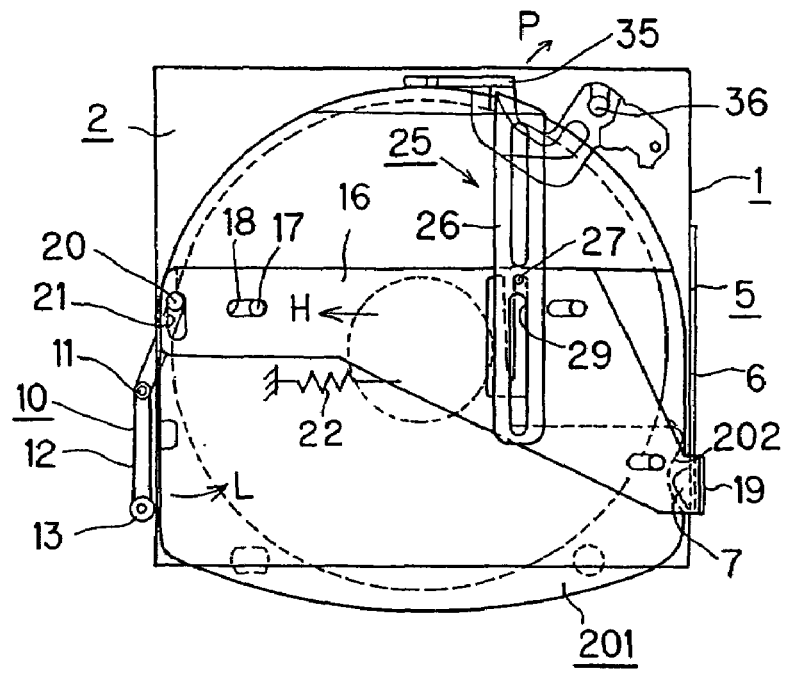
FIG. 15 is a plan view of the second disc cartridge inserted in the cartridge holder.

When the second disc cartridge 201 is further inserted into the cartridge holder 2, the pressing piece 7 will enter the concavity 202 formed at the one lateral side 109 as shown in FIG. 15 and the shutter member supporting piece 6 resiliently displaced in the direction of arrow E in FIG. 14 will resiliently be returned as shown in FIG. 15. At this time, the second disc cartridge 201 will be set in position inside the cartridge holder 2.

At this time, the control lever 16 will be moved by the tension spring 22 in the direction of arrow H in FIG. 15 to turn the pivoting lever 12 about the pivot 11 in the direction of arrow L in FIG. 15 and thus have the pressing piece 13 project into the cartridge holder 2, with the result that the pressing piece 13 will press the second disc cartridge 201 in the cartridge holder 2 to the one lateral side of the cartridge holder 2.

Thus, even when the second disc cartridge 201, not having the shutter member 115 that is supported, by pressing, by the shutter member supporting mechanism 5 as in the first disc cartridge 101, is inserted in the disc recorder/player, it will be set in the cartridge holder 2 while being pressed by the pressing mechanism 10. So, the second disc cartridge 201 is pressed and can thus be set in position stably in the cartridge holder 2 similarly to the first disc cartridge 101 provided with the shutter member 115.

Note that when the second disc cartridge 201 is inserted to the position where the pressing piece 7 enters the concavity 202, the ejection lever 35 is turned about the pivot 36 in the direction of arrow P in FIG. 15 as in case the first disc cartridge 101 is loaded and the spring member associated with the ejection lever 35 will store the force.

Note that to reduce the resilient deformation of the shutter member supporting piece 6, caused by the pressing piece 7 riding on the rear side 111 of the cartridge body 105 at the one lateral side 109, a concavity may be formed at the portion on which the pressing piece 7 is to ride.

Figure 16:
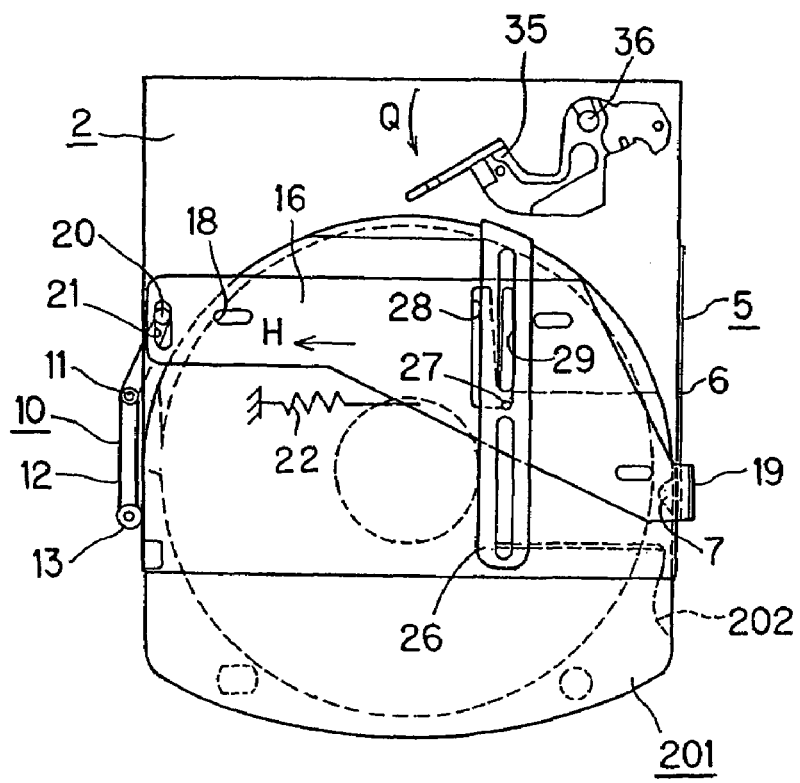
FIG. 16 is a plan view of the second disc cartridge ejected from in the cartridge holder.

To eject the second disc cartridge 201 from the cartridge holder 2 as shown in FIG. 15, the ejection mechanism provided at the disc recorder/player is operated to release the force stored in the spring member to pivot the ejection lever 35 in the direction of arrow Q in FIG. 16. As the ejection lever 35 is pivoted in the direction of arrow Q in FIG. 16, the second disc cartridge 201 is pressed by the ejection lever 35 to move in the direction of ejection from the cartridge holder 2.

The engagement projection 27 provided on the sliding lever 26 is left engaged in the second engagement recess 29 until the second disc cartridge 201 is pressed by the ejection lever 35 and the rear side 111 of the cartridge body 105 is thus moved to the position where it is to be ejected from the cartridge holder 2 as shown in FIG. 16. Since the engagement projection 27 is engaged in the second engagement recess 29, the control lever 16 is kept in its initial position. Also, since the control lever 16 is in its initial position, the second disc cartridge 201 is supported, by pressing, by the pressing mechanism 10. Therefore, the second disc cartridge 201 is pressed until it is pressed by the ejection lever 35 to move the ejecting position, and so it is prevented from being suddenly ejected from in the cartridge holder 2.

The user can take out the second disc cartridge 201 thus moved to the ejecting position from the cartridge holder 2 by holding the cartridge body 105 at the rear side 111.

As having been described in the foregoing, whichever the disc cartridge inserted in the cartridge holder 2 is the first disc cartridge 101 provided with the shutter member 115 or the second disc cartridge 201 not provided such a shutter member 115, the disc recorder/player according to the present invention can support the disc cartridge stably in the cartridge holder 2 by the shutter member supporting mechanism 5 or pressing mechanism 10, respectively.

Also, either the first or second disc cartridge 101 or 201 inserted into the cartridge holder 2 is supported, by pressing, by either the shutter member supporting mechanism 5 or pressing mechanism 10, respectively. So, whichever the disc cartridge inserted in the cartridge holder 2 is the first or second one 101 or 201, it can be applied with an almost equal pressure and thus held in the cartridge holder 2 under constant conditions.

Also, in the disc recorder/player according to the present invention, when the first or second disc cartridge 101 or 201 is inserted into the cartridge holder 2 with the upside down, the shutter member moving piece 8 enters, and is engaged in, the incorrect-insertion preventive recess 123 formed in the cartridge body 105. Thus, the first or second disc cartridge 101 or 201 is prevented from being further inserted into the cartridge holder 2, whereby it is possible to prevent incorrect insertion of the disc cartridge into the cartridge holder 2.

In the disc recorder/player according to the present invention, when the first disc cartridge 101 provided with the shutter member 115 is loaded, it is supported, by pressing, by the shutter member supporting mechanism 5. In case the second disc cartridge 201 without any such shutter member is inserted, it is supported with a pressure applied by the pressing mechanism 10. Thus, the disc cartridge loaded in the disc recorder/player can positively be held in the disc cartridge 2 whether it is the first or second disc cartridge 101 or 201.

Also, the first or second disc cartridge 101 or 201 loaded in the disc recorder/player is supported by the shutter member supporting mechanism 5 or pressing mechanism 10, respectively. So, the disc cartridge, whether it is the first or second one 101 or 201, it can be applied with an almost equal pressure and thus held in the cartridge holder 2 under constant conditions.

Note that the second disc cartridge 201 compatible with the disc recorder/player according to the present invention is not limited to the aforementioned one provided but it may be any type if it would not be applied with any pressure from the shutter member supporting mechanism 5 at the disc recorder/player when inserted in the cartridge holder 2. Therefore, the disc cartridge used with the disc recorder/player according to the present invention is not limited to any one whose front side at which it is to first be inserted into the disc recorder/player is formed semicircular, but may have a rectangular front side.

It should be understood by those skilled in the art that various modifications, combinations, sub-combinations and alterations may occur depending upon design requirements and other factors insofar as they are within the scope the appended claims or the equivalents thereof.

What is claimed is:

1. A disc recording and/or playback apparatus comprising:
a cartridge holder in which there is to be held a first disc cartridge including a body housing a disc-shaped recording medium rotatably therein, having formed therein extending toward a center thereof from one of lateral sides thereof a write and/or read aperture through which the disc-shaped recording medium is partially exposed to outside in a range between inner and outer radii thereof and a shutter member supported movably on the cartridge body to open and close the write and/or read aperture, or a second disc cartridge including a body housing a disc-shaped recording medium rotatably therein, having formed therein extending toward a center thereof from one of lateral sides thereof a write and/or read aperture through which the disc-shaped recording medium is partially exposed to outside in a range between inner and outer radii thereof;
a shutter member supporting mechanism to support, by pressing, the shutter member of the first disc cartridge inserted in the cartridge holder to limit movement of the shutter member;

a pressing mechanism to press the second disc cartridge inserted in the cartridge holder; and a pressing controlling mechanism provided in connection with the shutter member supporting mechanism and which is to be moved due to displacement of the shutter member supporting mechanism by the first disc cartridge inserted into the cartridge holder to displace the pressing mechanism for removing pressure applied to the first disc cartridge and has the pressing mechanism press the second disc cartridge inserted in the cartridge holder.

2. The apparatus according to claim 1, wherein the shutter member supporting mechanism is resiliently displaceable by the shutter member provided on the first disc cartridge being inserted into the cartridge holder to support the first disc cartridge by pressing.

3. The apparatus according to claim 2, further comprising an incorrect-insertion limiting mechanism to limit further insertion of the first or second disc cartridge once incorrectly inserted upside down into the cartridge holder correspondingly to a position at which the shutter member supporting mechanism is displaced by the shutter member provided on the first disc cartridge and returned to its initial position because of engagement on the shutter member.

4. The apparatus according to claim 1, wherein the shutter member supporting mechanism has a shutter member supporting piece made of an elastic material and which is to be pressed by a disc cartridge being inserted into the cartridge holder and resiliently be displaced in a direction away from the disc cartridge.

5. The apparatus according to claim 4, wherein the shutter member supporting piece is resiliently displaceable on the shutter member provided on the first disc cartridge being inserted into the cartridge holder and resiliently returns to its initial state.

6. The apparatus according to claim 1, wherein the shutter member supporting mechanism and pressing mechanism are located at one and other lateral sides, respectively, of the cartridge holder.

7. The apparatus according to claim 1, wherein the pressing controlling mechanism has a distance of movement thereof controlled correspondingly to a distance of displacement of the shutter member supporting mechanism, which varies depending upon of which type the disc cartridge inserted into the cartridge holder is, first or second, to control pressure applied to the first or second disc cartridge being inserted into the cartridge holder.

8. The apparatus according to claim 1, wherein the pressing controlling mechanism has a position of movement thereof controlled correspondingly to a distance of displacement of the shutter member supporting mechanism, which varies depending upon of which type the disc cartridge inserted into the cartridge holder is, first or second, and is fixed to a position to which it has been moved while the first or second disc cartridge is being inserted into the cartridge holder.

9. The apparatus according to claim 1, wherein the first disc cartridge includes a shutter locking mechanism that is to be engaged in an engagement hole formed in the shutter member when the shutter member is in a position to close the write and/or read aperture and locks the shutter member in that position, the shutter locking mechanism being displaced by the shutter member supporting mechanism engaged in an engagement hole formed in the shutter member and disengaged from the shutter member when the first disc cartridge is inserted into the cartridge holder, to thereby allow the shutter member to move in relation to the cartridge body.

* * * * *